Figure 2:
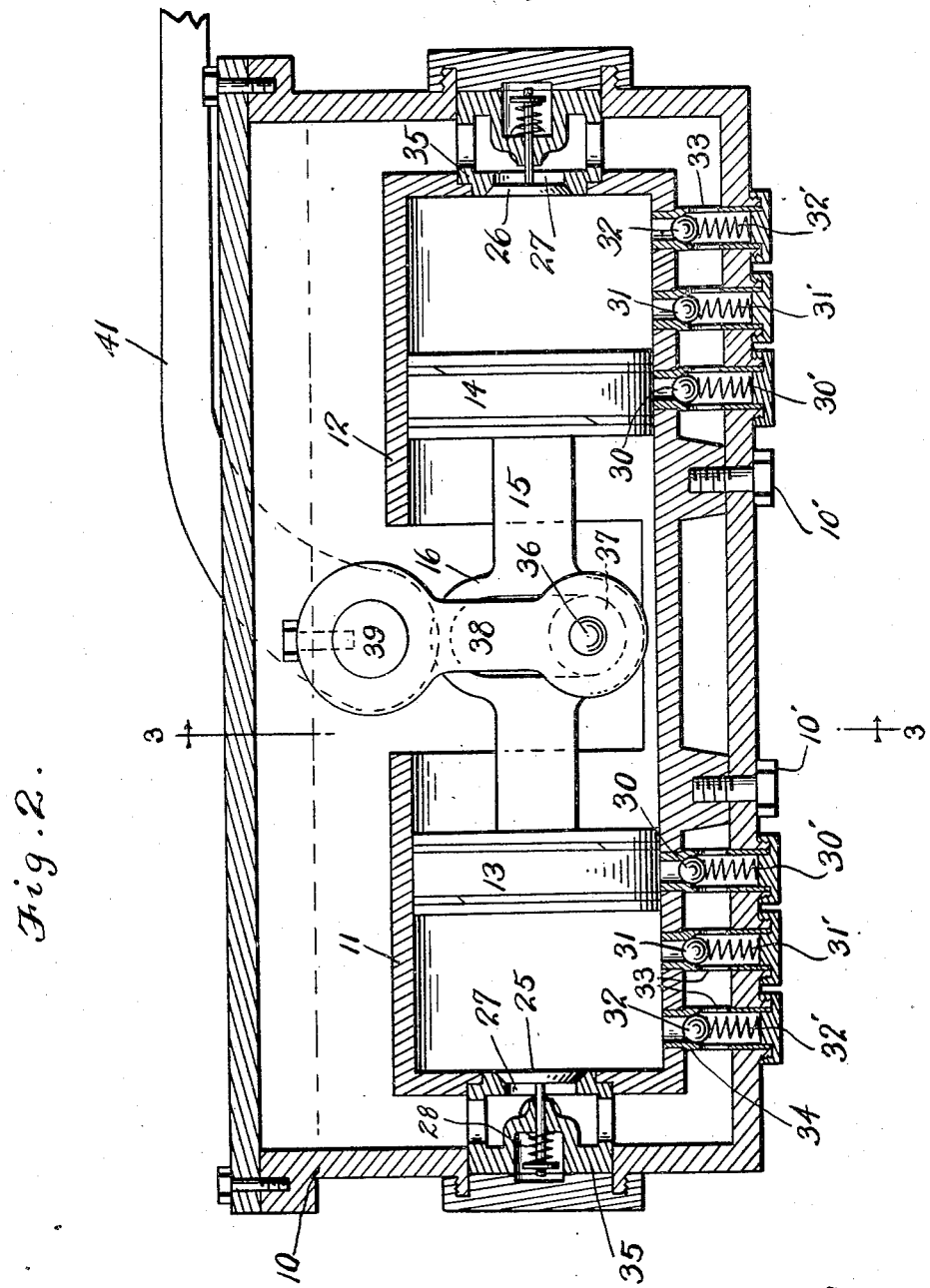

April 21, 1925.
P. A. DENNETT
1,534,059
FLUID PRESSURE CONTROLLING DEVICE
Filed Feb. 11, 1924   2 Sheets-Sheet 1
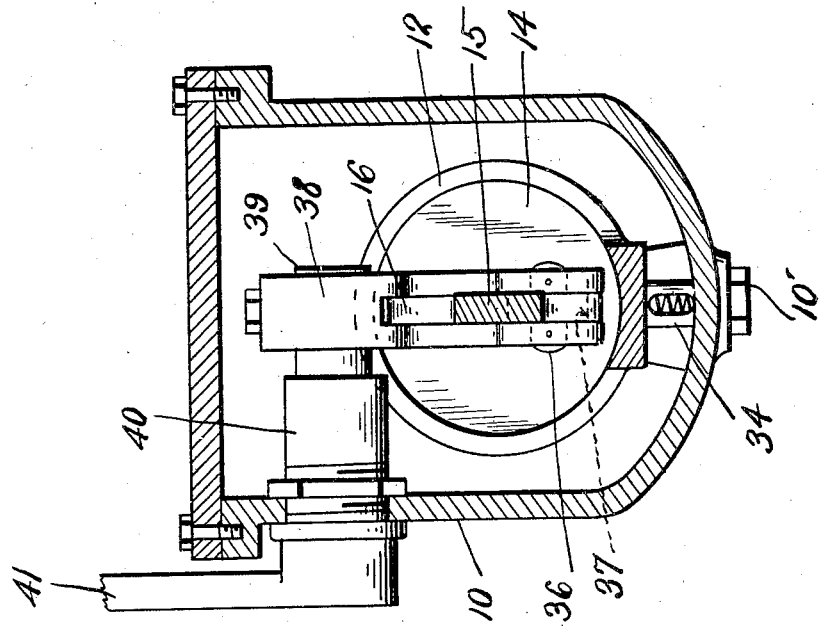
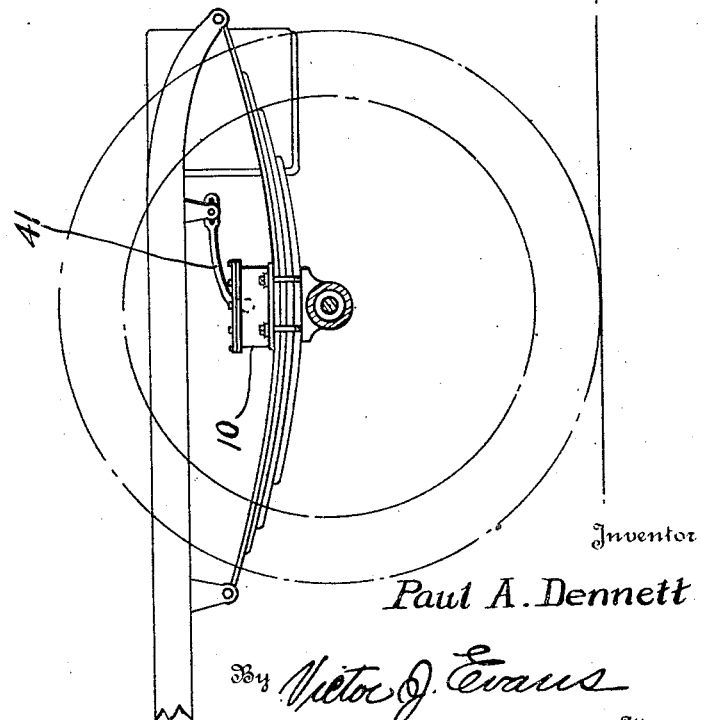
Witness
L. B. James
Inventor
Paul A. Dennett
By Victor J. Evans
Attorney April 21, 1925.

P. A. DENNETT

FLUID PRESSURE CONTROLLING DEVICE

Filed Feb. 11, 1924

1,534,059

2 Sheets-Sheet 2

Witness
L. B. James

Inventor
Paul A. Dennett

By Victor J. Evans
Attorney

Patented Apr. 21, 1925.

1,534,059

UNITED STATES PATENT OFFICE.

PAUL A. DENNETT, OF SACO, MAINE.

FLUID-PRESSURE-CONTROLLING DEVICE.

Application filed February 11, 1924. Serial No. 692,126.

*To all whom it may concern:*

Be it known that I, PAUL A. DENNETT, a citizen of the United States, residing at Saco, in the county of York and State of Maine, have invented new and useful Improvements in Fluid-Pressure-Controlling Devices, of which the following is a specification.

The object of this invention is to provide means for controlling the springs of a motor car, and a compensating device suitable for use under all similar conditions.

A further object is to provide means for automatically and progressively increasing the resistance offered to the flexing movement of the springs.

A still further object is to provide means whereby greater resistance may be offered to movement in one direction than in the opposite direction, so that the downward movement of a car body may be cushioned, and on the rebound the resistance offered to the upward movement of the body will increase progressively, to a degree greater than on the initial movement.

With the foregoing and other objects in view, the invention consists in the novel construction and arrangement of elements described, illustrated and claimed, it being understood that modifications may be made within the scope of the claims without departing from the spirit of the invention.

In the drawings, Figure 1 is a view chiefly in side elevation showing the manner of mounting the device with reference to the frame of a vehicle and one of the springs thereof; Figure 2 is a view of the device in longitudinal section; Figure 3 is a section on line 3—3 of Figure 2.

A casing 10 adapted to contain oil is to be mounted on a stationary element of a vehicle or the like, and rigidly secured within the casing by bolts 10′ are cylinders 11 and 12 mounted in alinement and having open ends oppositely located and spaced from each other.

Pistons or plungers 13 and 14 are connected by a piston rod 15 formed with a slotted yoke 16, the slot extending perpendicularly with reference to the axis of the piston rod.

Inlet valves at the ends of the respective cylinders are designated 25 and 26, these valves opening ports 27 admitting oil to the interior of the cylinders. The valves are held closed by pressure within the cylinders and by springs 28.

Each cylinder has two or more outlet valves—three being illustrated—valve 30 being closed by spring 30′ of considerable strength, valve 31 by a spring 31′, somewhat more resilient, and valve 32 by spring 32′ of still greater resiliency.

These valves are termed high pressure, low pressure, and medium pressure valves, and their ports 33 admit oil to the casing from the cylinders. Each valve is mounted in a cage 34, and the inlet valves are mounted in cages 35.

A pin 36 mounts a roller 37 working in the slot of yoke 16, and this pin passes through fork or yoke 38 rigid with a shaft 39 mounted in a bearing 40 in the casing. Rigid with the shaft is a crank arm 41 adapted for connection with a vehicle axle, spring, or other element movable with reference to the element mounting the casing 10.

In operation, downward pressure on the outer end of arm 41 causes movement of the pistons within the cylinders, and the piston advancing into its cylinder will encounter progressively greater resistance owing to the relative resiliency or lack of resiliency of the springs. If the two sets of springs are alike, the reverse movement of the piston rod will be similarly cushioned, but if one set of springs is replaced by stronger springs the reverse movement will be retarded to a greater extent. The advancing plunger cuts off the passage of oil through a low pressure valve port when a valve responsive only to increased pressure is acting as the retarding element.

What I claim is:

1. In a device of the class described, a casing, a plurality of cylinders therein, pistons in the cylinders, means rigidly connecting the pistons, valves admitting fluid from the casing to the cylinders, a plurality of valves for discharging fluid from each cylinder to the casing, and springs for these valves, the springs for the valves of each cylinder being of different strength.

2. In a device of the class described, a casing, a plurality of cylinders therein, pistons in the cylinders, means rigidly connecting the pistons, valves admitting fluid from the casing to the cylinders, a plurality of valves for discharging fluid from each cylinder to the casing, springs for these valves, the springs of adjacent valves in each cylinder being of different strength, and the springs of correspondingly located valves of the respective cylinders being of different strength.

3. In a device of the class described, a casing, a cylinder therein having an inlet port at one end, communicating with the casing, a valve for this port, said cylinder having a series of outlet ports longitudinally of the cylinder, valves for the outlet ports and springs for these valves, the springs decreasing in resiliency from one end of the series to the other.

4. In a device of the class described, a plurality of cylinders, a casing inclosing the cylinders, said cylinders being in alinement and opening toward each other, pistons for the cylinders, a device rigidly connecting the pistons, an operating element connected with said device, inlet valves admitting fluid to the cylinders from the casing, the cylinders each having a longitudinal series of ports, a valve for each port, and a spring for each valve, the springs increasing in strength toward the inlet valves.

In testimony whereof I affix my signature.

PAUL A. DENNETT.